(12) United States Patent
Kardous

(10) Patent No.: US 7,401,519 B2
(45) Date of Patent: Jul. 22, 2008

(54) SYSTEM FOR MONITORING EXPOSURE TO IMPULSE NOISE

(75) Inventor: Chucri A. Kardous, Florence, KY (US)

(73) Assignee: The United States of America as represented by the Department of Health and Human Services, Washington, DC (US)

(*) Notice: Subject to any disclaimer, the term of this patent is extended or adjusted under 35 U.S.C. 154(b) by 212 days.

(21) Appl. No.: 10/564,860

(22) PCT Filed: Jul. 13, 2004

(86) PCT No.: PCT/US2004/022499

§ 371 (c)(1), (2), (4) Date: Jan. 11, 2006

(87) PCT Pub. No.: WO2005/008194

PCT Pub. Date: Jan. 27, 2005

(65) Prior Publication Data

US 2006/0219015 A1 Oct. 5, 2006

Related U.S. Application Data

(60) Provisional application No. 60/487,449, filed on Jul. 14, 2003.

(51) Int. Cl.
*G01H 17/00* (2006.01)
*H04R 29/00* (2006.01)
*A61F 11/06* (2006.01)

(52) U.S. Cl. .............................. 73/646; 381/56; 381/72

(58) Field of Classification Search ................... None
See application file for complete search history.

(56) References Cited

U.S. PATENT DOCUMENTS

| | | | |
|---|---|---|---|
| 3,977,257 A | 8/1976 | Steger | |
| 4,003,264 A | 1/1977 | Erlandsson et al. | |
| 4,028,947 A | 6/1977 | Cowen | |
| 4,100,810 A | 7/1978 | Sima, Jr. et al. | |
| 4,554,639 A | 11/1985 | Baker et al. | |
| 4,949,580 A | 8/1990 | Graham et al. | |
| 5,046,101 A * | 9/1991 | Lovejoy | 381/57 |

(Continued)

OTHER PUBLICATIONS

Seiler, John P. and Giardino, Dennis A., "The Effect of Threshold on Noise Dosimeter Measurements and Interpretation of Their Results," 16 pages, Aug. 1994.

(Continued)

*Primary Examiner*—Hezron E. Williams
*Assistant Examiner*—Rose M Miller
(74) *Attorney, Agent, or Firm*—Klarquist Sparkman, LLP

(57) ABSTRACT

In one embodiment, a system for monitoring exposure to impulse noise includes a sound-sensing device, such as a microphone or other type of pressure transducer, operable to sense impulse noise, and a storage module operable to store the waveform of the impulse noise sensed by the sound-sensing device. The sound-sensing device desirably is operable to sense impulses that are greater than 146 dB, such as impulses created by construction machinery and firearms. The system also can include a processor operable to calculate one or more noise parameters of the impulse noise from the waveform, and a user interface program operable to display said one or more noise parameters selected by a user.

29 Claims, 6 Drawing Sheets

U.S. PATENT DOCUMENTS

| | | | |
|---|---|---|---|
| 6,182,018 | B1 | 1/2001 | Tran et al. |
| 6,350,243 | B1 | 2/2002 | Johnson |
| 6,385,261 | B1 | 5/2002 | Tsuji et al. |
| 6,456,199 | B1 | 9/2002 | Michael |
| 6,507,650 | B1 | 1/2003 | Moquin |
| 6,567,524 | B1 * | 5/2003 | Svean et al. ............... 381/71.1 |
| 7,151,835 | B2 * | 12/2006 | Yonovitz et al. ............. 381/56 |
| 2003/0191609 | A1 * | 10/2003 | Bernardi et al. ............. 702/191 |

OTHER PUBLICATIONS

"High-Sensitivity Dynamic Pressure Sensors," sales bulletin, PCB Piezotronics, Inc., 2 pages. 2002.

International Search Report and Written Opinion of PCT Application No. PCT/US2004/022499.

Canadian Centre for Occupational Health and Safety website, "OSH Answers: Noise- Measurement of Workplace Noise," http://www.ccohs.ca/oshanswers/phys_agents/noise_measurement.html?print (publication date unknown).

Kardous et al., "Noise Exposure Assessment and Abatement Strategies at an Indoor Firing Range," *Applied Occupational and Environmental Hygiene*, 18:629-636, 2003.

Kardous et al., "Limitations of Using Dosimeters in Impulse Noise Environments," *Journal of Occupational and Environmental Hygiene*, 1:456-462, Jul. 2004.

Kardous, "New Design Concept for an Impulse Noise Dosimeter," abstract, May 2003.

Kardous, "New Design Concept for an Impulse Noise Dosimeter," poster, presented at the American Industrial Hygiene Conference, May 2003.

Kardous, "Limitations of Integrating Impulse Noise When Using Dosimeters," abstract, Mar./Apr. 2002.

Kardous et al., PowerPoint presentation, "Limitations of Integrating Impulse Noise When Using Dosimeter," presented at the American Industrial Hygiene Conference, 26 pages, Jun. 2002 (available on Internet Aug. 2, 2002).

Kardous et al., "New System for Monitoring Exposure to Impulsive Noise," Rio 2005 Inter-noise Environmental Noise Control, The 2005 Congress and Exposition on Noise Control Engineering, Aug. 7-10, 2005, Rio de Janeiro, Brazil.

Kardous et al., "Noise Dosimeter for Monitoring Exposure to Impulse Noise," Applied *Acoustics*, 66:974-985, 2005.

Li et al., "The Application of Frequency and Time Domain Kurtosis to the Assessment of Hazardous Noise Exposures," *J. Acoust. Soc. Am.*, 96(3): 1435-1444, Sep. 1994.

Patterson et al., "An Experimental Basis for the Estimation of Auditory System Hazard Following Exposure to Impulse Noise," in *Noise-Induced Hearing Loss*, pp. 336-384 (A. Dancer et al. eds. 1992).

Patterson, et al., "The Hazard of Exposure to Impulse Noise as a Function of Frequency," vol. I *U.S. Army Aeromedical Research Laboratory*, USAARL Report No. 91-18, 1991.

Perkins et al., "Effect of Inter-Stimulus Interval on the Production of Hearing Loss from Impulse Noise," *J. of the Acoust. Soc. Am.*, 57 (Supp. No. 1) pp. S1 and S62, 1975.

Price et al., "Evaluation of Hazard from Intense Sound with a Mathematical Model of the Human Ear," *J. Acoust. Soc. Am.*, 100(4)(2):2674, 1996.

Price, "Executive Summary of the Development and Validation of AHAAH," retrieved from www.arl.army.mil/main/ahaah/html_docs/executive_sum.htm (publication date unknown).

\* cited by examiner

A-duration = $t_1 - t_0$

B-duration = $(t_1 - t_0) + (t_3 - t_2)$

C-duration = $(t_1 - t_0) + (t_3 - t_2) + (t_5 - t_4)$

D-duration = $t_1 - t_0$

SYSTEM FOR MONITORING EXPOSURE TO IMPULSE NOISE

CROSS REFERENCE TO RELATED APPLICATION

The present application is a U.S. national stage application of International Application No. PCT/US2004/022499, filed Jul. 13, 2004, which claims the benefit of U.S. Provisional Patent Application No. 60/487,449, filed Jul. 14, 2003 which is incorporated herein by reference.

FIELD

The present invention relates to embodiments of a system for monitoring exposure to impulse noise.

BACKGROUND

Noise dosimeters have been used extensively over the past two decades to document personal exposures to noise and to assure workplaces comply with permissible noise exposure levels. The Specification for Personal Noise Dosimeters (S1.25-1991 (R2001)) of the American National Standards Institute (ANSI), states that dosimeters should be suitable for measurements of impulsive, intermittent, and continuous noise.

Current noise dosimeters typically measure noise levels (average, maximum, minimum, and peak), noise dose, projected noise dose, and sound exposure level. The Occupational Safety and Health Administration (OSHA) Noise Exposure Standard, set forth in 29 C.F.R. § 1910.95, requires personal exposure to noise to be measured as a noise dose over a work day. Total noise dose, D, over a work day is calculated according to the following equation:

$$D = 100 \times [C_1/T_1 + C_2/T_2 + \ldots + C_N/T_N], \quad \text{(Equation 1)}$$

where $C_N$ is the total time of exposure (in hours) at a specific noise level, and $T_N$ is the allowable exposure duration at the measured A-weighted slow sound level, $L_{AS}$. $T_N$ is computed by the equation $$T_N = 8/2^{(L_{AS}-90)/5} \quad \text{(Equation 2)}$$

This manner of computing dose is based on the assumption that halving the exposure time to a noise level creates the same degree of hazard to hearing as reducing the noise level by a specified amount (referred to as an "exchange rate"), and that doubling the exposure time creates the same degree of hazard as increasing the noise level by the same amount. The OSHA standard, expressed in Equation 2, applies an exchange rate of 5 (dBA(the National Institute for Occupational Safety and Health recommends an exchange rate of 3 dBA). Applying Equation 2, an exposure of 90 dBA for four hours is considered to be equivalent to either (1) an exposure of 85 dBA for eight hours, or (2) an exposure of 95 dBA for two hours.

Although the foregoing method of computing dose has proved reliable for continuous noise levels, dose calculated by this method does not accurately represent the potential risk of an impulse event. For example, using Equations 1 and 2 above, an impulse generated by a single gun-shot in an indoor firing range can contribute as much as 106% to 158% of the daily allowable dose.

Further, current state-of-the-art noise dosimeters have a sound pressure level (SPL) dynamic measurement range of about 80-146 dB. Although this may be adequate for some impact noise environments, current state-of-the-art noise dosimeters cannot accurately measure impulse noise levels above 146 dB, such as impulse noise levels produced by weapons and certain construction equipment. When a dosimeter is used to measure an impulse noise level greater than its dynamic range, the dosimeter "clips" the noise level at the upper end of its measurement range.

Accordingly, there exists a need for new and improved systems for measuring and assessing noise exposure in an environment containing impulse noise.

SUMMARY

The present disclosure concerns embodiments of a system for monitoring and assessing the risk of auditory damage from exposure to impulse noise. In one representative embodiment, the system includes a sound-sensing device, such as a microphone or other type of pressure transducer, operable to sense impulse noise, and a storage module operable to store the waveform of the noise sensed by the sound-sensing device. The sound-sensing device desirably is operable to accurately detect impulses that are greater than 146 dB, such as impulses created by construction machinery and firearms. The system also can include a processor operable to calculate one or more noise parameters from the waveform, and a user interface program operable to display one or more noise parameters selected by a user. Without limitation, the noise parameters can be energy, spectral distribution, kurtosis, number of impulses, peak pressure level, rise time, duration, Auditory Hazard Units, and various other noise parameters.

In one embodiment, a portable sound-sensing unit includes the sound-sensing device and the storage module. To acquire a noise sample for analysis, the unit is worn or otherwise carried by a user in an environment containing impulse noise. Noise detected by the sound-sensing unit is converted into a digital signal containing the acoustic waveform of the noise, which is recorded on the storage module. The unit can include a processor and a display for calculating and displaying selected noise parameters, respectively. The user can then analyze the selected noise parameters to assess the risk of hearing damage posed by the noise.

In another representative embodiment, a method for monitoring exposure to impulse noise is provided. The method includes detecting impulse noise and recording an acoustic waveform of the detected impulse noise levels. A user can select, via one or more user-interface elements, one or more noise parameters of the waveform, which are then calculated and displayed on a display screen for viewing by the user. The user can then assess the potential hazard of the impulse noise through analysis of the selected noise parameters.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises."

As used herein, a group of individual members stated in the alternative includes embodiments relating to a single member of the group or combinations of multiple members. For example, the term "a, b, or c," includes embodiments relating to "a," "b," "c," "a and b," "a and c," "b and c," and "a, b, and c."

As used herein, the term "noise" refers to any type of noise, including, but not limited to impulsive, intermittent, and continuous noise.

Figure 1A:
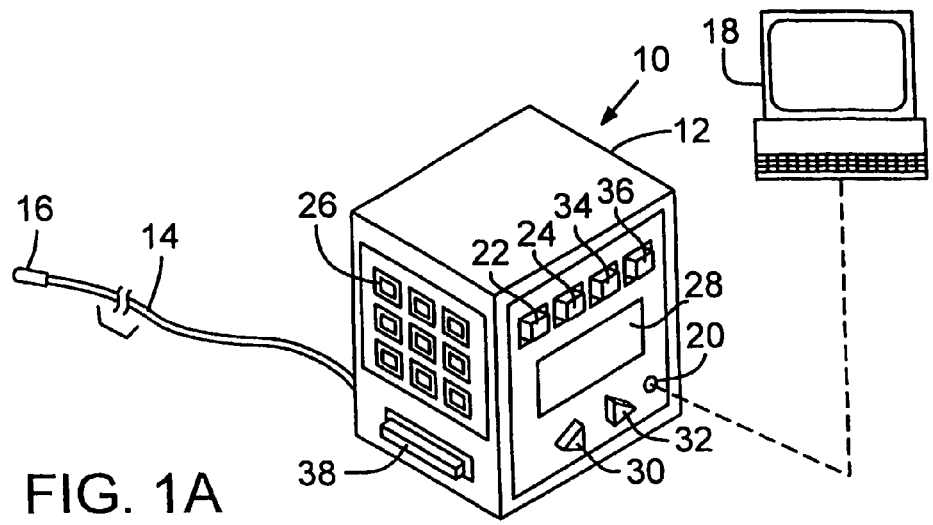
FIG. 1A is a perspective view of one embodiment of a system for monitoring personal exposure to impulse noise.

Referring to FIG. 1A, there is shown one embodiment of a system, indicated generally at 10, for monitoring noise exposure in an environment containing impulse noise. The system 10 includes a portable sound-sensing unit 12, which is relatively light and small, so that it can be placed or worn on a person's clothing. The unit 12 desirably receives power from an onboard battery storage system, such as rechargeable or replaceable batteries (not shown) for ease of portability and use. A cable, or wire, 14, connects a sound-sensing device, such as the illustrated microphone 16, to unit 12. In use, unit 12 is carried by a user or is worn on the user's belt or other suitable support. The microphone 16 is disposed close to one of the user's ears so that the noise environment at the user's ear can be monitored through the microphone 16. For measurements that need to be conducted under hearing protection, the microphone 16 can be embedded or placed inside the earpiece of a hearing protector (not shown).

The construction of the microphone 16 desirably is such that the outer diameter and membrane surface of the pressure transducer of the microphone are minimized so as to maximize the sound-level range of the microphone. In particular embodiments, the microphone is operable to sense impulse noise levels greater than 140 dB, and desirably can detect impulse noise levels up to about 175 dB. In addition, the microphone desirably has a linear response up to at least 40 KHz. One example of a microphone that can be used is a model 4136 microphone available from Bruel & Kjaer of Norcross, Ga.

While the illustrated embodiment includes a microphone for sensing sounds, other types of sound-sensing or sound-detecting devices can be used. For environments in which there are more extreme impulse noises (such as impulses created by artillery fire from tanks and other military equipment), dynamic pressure sensors, such as those that use piezoelectric-sensing technology, can be used. One example of a dynamic sensor that can be used is a model 106B dynamic pressure sensor available from PCB Piezotronics, Inc. of Depew, N.Y.

In certain embodiments, noise signals from the microphone are converted into digital format and recorded in a suitable storage module inside the unit 12. The storage module can be, for example, a digital audio tape recorder, a hard drive, or analogous device for storing in digital format the acoustic waveform of the noise detected by microphone. Unit 12 also may be equipped to receive a removable data-storage device, such as a removable memory card 38 (e.g., a flash memory card) for storing the waveform. MP3 and other compression technology that does not degrade the quality of the original waveform can be implemented in unit 12 to enhance the storage capabilities of the unit 12.

The unit 12 may be linked to communicate with an external computing device 18, which can be a microcomputer or a general purpose desktop or laptop computer. In the illustrated embodiment, the unit 12 includes an infrared emitter 20 to communicate with the computing device 18. However, other linkage devices also may be used to communicate between external computing device 18 and unit 12, such as by using radio waves, modems, Bluetooth® wireless technology, 802.11 wireless technology, direct connections, and the like. In one implementation, noise signals are relayed in real time to the external computing device 18 for storage and analysis, in which case the storage module and memory card 38 of unit 12 can be optional.

In a simple embodiment, the unit 12 may include an ON/OFF power switch, or button, 22, to which unit 12 responds by beginning and/or ending a sampling period, and a calibration button 24 for calibrating the unit 12. In a more sophisticated embodiment, unit 12 may include an input keypad 26, which can be an alpha or alpha numeric keypad. Using keypad 26, a user may input different operating parameters of the unit 12. Unit 12 also may include a display screen 28, which can be a liquid crystal display (LCD), to indicate which selections have been made using keypad 26, to display different operating parameters of unit 12, and/or to display different noise parameters measured by unit 12 (e.g., energy flux), as further described below. Scrolling buttons 30 and 32 may allow different instructions or selections to be scrolled across, or up and down along, screen 28.

In still other alternative embodiments, the display screen 28 also is a touch screen, in addition to, or in place of, keypad 26. The touch screen may include a series of images that, when touched with a finger or stylus, program the unit 12. Alternatively, the touch screen may include a character recognition area for receiving written inputs using a stylus, such as the graffiti recognition features of the Palms operating system (Palm, Inc., Santa Clara, Calif.). Thus, a touch screen provides an alternative means for programming unit 12 in addition to the keypad. Unit 12 may also have various other control buttons, as known in the art, such as a reset button 34 and a battery-test button 36.

Figure 1B:
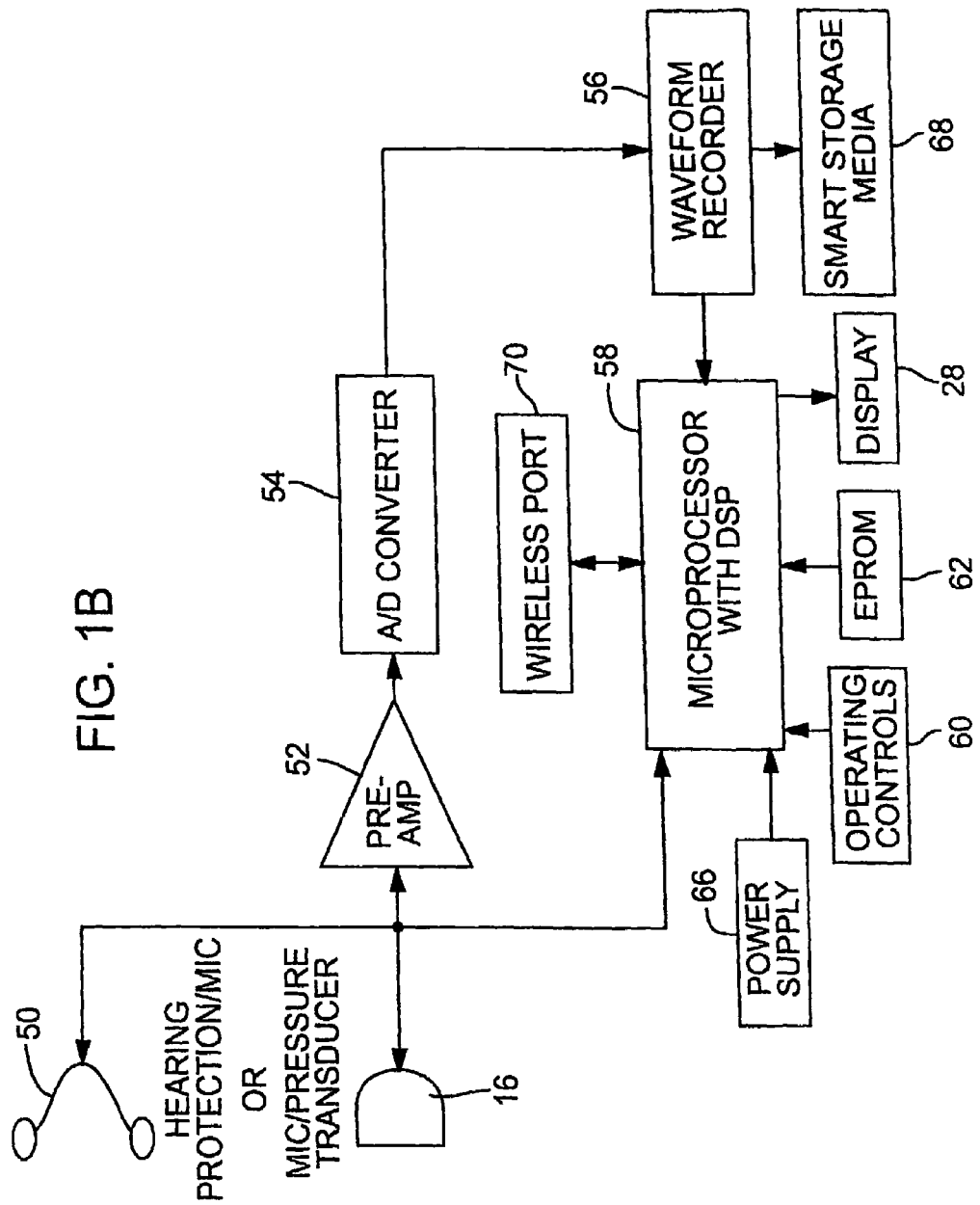
FIG. 1B is a block diagram of the electronic components of the system shown in FIG. 1A.

Referring now to FIG. 1B, there is shown a block diagram of the electrical components of the unit 12, according to one embodiment. Microphone 16 (or other type of pressure transducer) senses the sound pressure level incident upon it and converts the sound into an electrical signal, which includes the acoustic waveform of the sounds detected by microphone 16. The electrical signal is then amplified by an amplifier 52, converted to a digital signal by an analog-to-digital converter (ADC) 54, and recorded in digital format on a waveform recorder 56 (e.g., a digital audio tape recorder). The waveform recorder 56 can have removable storage media 68 (e.g., removable memory card 38) for storing the signal.

In lieu of, or in addition to, the microphone 16, the unit 12 can include a hearing protector 50 with an embedded microphone for sensing noise in an environment in which hearing protection must be worn. For example, the hearing protector 50 can be a conventional muff-type hearing protector with a microphone contained within one of the earpieces of the hearing protector.

The ADC 54 desirably has a resolution sufficient to permit accurate measurements of peak levels of impulses over ambient noise levels. In addition, the ADC 54 desirably has a sampling rate sufficient to accurately capture impulses that have a rise time as low as 5 sec. In particular embodiments, for example, the ADC 54 has at least a 24-bit resolution and at least a 200 KHz sampling rate.

The unit 12 also includes a microprocessor 58 with digital signal processing capabilities and operating controls 60 (e.g., buttons 22, 24, 34, 36, 30, and 32, and keypad 26) for accessing the microprocessor 58. Microprocessor 58 in the form shown has an EPROM chip 62 (although other memory chips, such as an EEPROM chip, also can be used), display 28, a power supply 66, and a wireless port 70 (e.g., infrared emitter 20) for sending data to external computing device 18 (FIG. 1A).

As shown in FIG. 1B, the microphone 16 and the microphone embedded within hearing protector 50 desirably are electrically coupled in a feedback loop to the microprocessor 58. In use, the microprocessor 58 continuously monitors an input signal from the microphone being used. If there is a drift or change in the input signal that indicates that the microphone has decalibrated, the microprocessor 58 automatically sends a recalibration signal back to the microphone.

To assess the risk of hearing damage from exposure to the impulse noise levels detected by unit 12, the microprocessor 58 calculates various noise parameters (also referred to as "metrics") from the acoustic waveform, records the data in the EPROM chip 62, and displays the data on display screen 28 for viewing by a user. Such noise parameters can include, without limitation, peak pressure level, impulse duration, rise time, spectral distribution, number of impulses, kurtosis, energy (e.g., energy flux), temporal spacing, and Auditory Hazard Units (AHUs), each of which is further described below. Other known noise parameters, such as $L_{eqA-8hr}$ (the A-weighted continuous sound level for an 8-hour period), $L_{eq}$, or various other weighted or non-weighted sound levels, can be calculated by the embodiments disclosed herein.

Several examples are discussed below to better illustrate these noise parameters. In each example, impulse noise levels were detected in an indoor firing range with a Bruel & Kjaer model 4136¼" microphone powered by a Bruel & Kjaer model 2807 power supply, and recorded at 48,000 samples per second on a Panasonic model SV-225 digital audio tape recorder.

Peak Pressure Level

Peak pressure level is the maximum instantaneous sound pressure that occurs during a given time period. Peak pressure level desirably is measured without a frequency weighting. As noted above, the microphone 16 desirably is operable to accurately detect peak pressure levels above 140 dB to enable the unit 12 to be used to monitor exposure to impulse noises commonly present in industrial or military environments.

Figure 2:
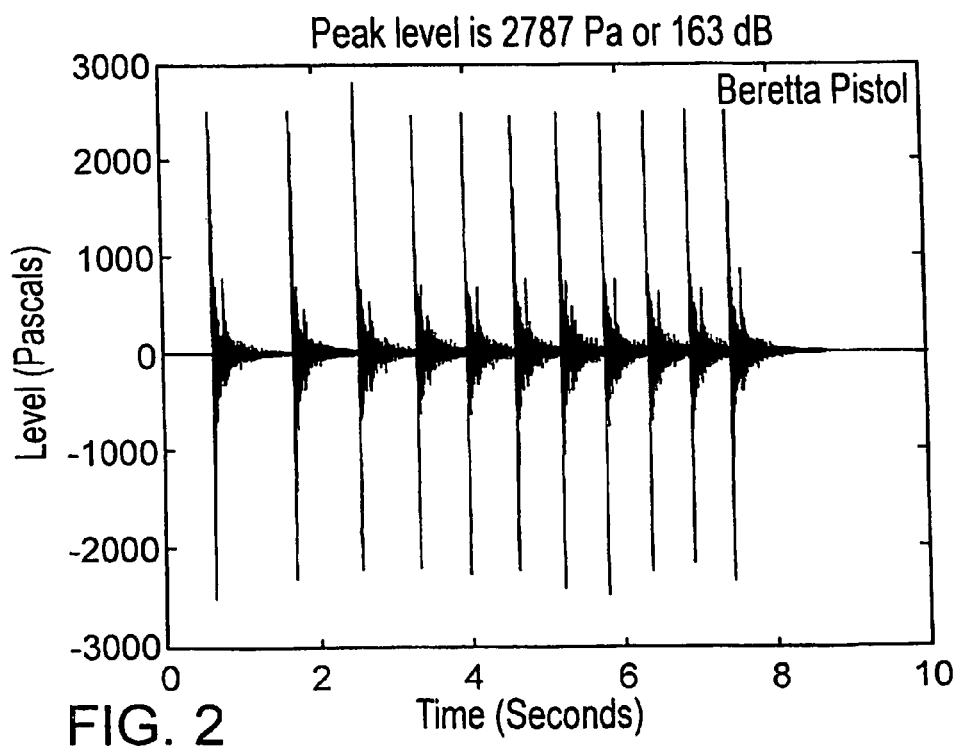
FIG. 2 shows a time-varying acoustic waveform consisting of successive impulses created by firing a pistol.

FIG. 2 is a time-varying waveform illustrating the peak pressure levels of multiple impulses created by firing a Beretta® .40-caliber pistol inside a firing range. As shown in FIG. 2, the peak pressure levels, which reached a maximum of 163 dB, were recorded without distortion or clipping at a level below the actual peak levels of the impulses.

Rise Time and Impulse Duration

Rise time is the time difference between the beginning of an impulse and the peak of the impulse. Impulse duration is a measure of a specified time interval(s) on the sound pressure-time graph of an impulse noise. Four types of durations that can be used to characterize an impulse noise are known as A-duration, B-duration, C-duration, and D-duration.

Figure 3A:
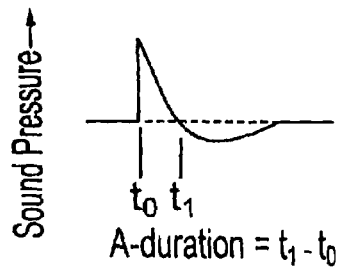
FIGS. 3A-3D are graphs illustrating the A-duration, B-duration, C-duration, and D-duration, respectively, of different impulses.
Figure 3B:
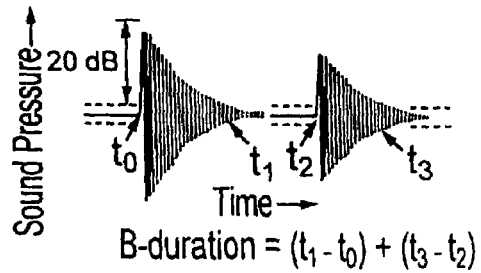
Figure 3C:
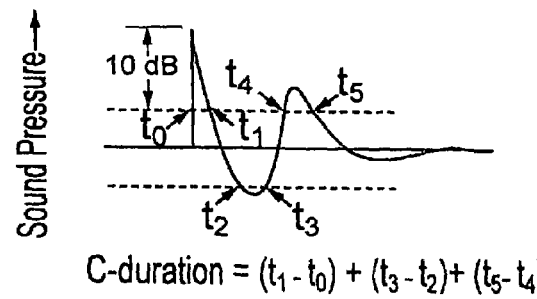
Figure 3D:
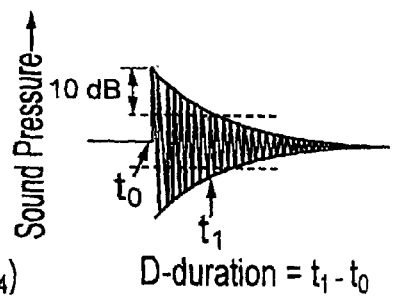

A-duration, which is illustrated in FIG. 3A, is the time interval between a time $t_0$ at the beginning of an impulse and a time $t_1$ at the first zero-crossing of the sound pressure level. B-duration (also referred to as "pressure envelope duration"), which is illustrated in FIG. 3B, is the cumulative total of each time interval that encompasses an envelope of positive and negative pressure fluctuations within 20 dB of the peak pressure level for an initial impulse and any successive reflections of the initial impulse. In the example shown in FIG. 3B, the B-duration is equal to $(t_1-t_0)+(t_3-t_2)$, where $(t_1-t_0)$ is the pressure envelope within 20 dB of the peak pressure level of an initial impulse and $(t_3-t_2)$ is the pressure envelope within 20 dB of the peak pressure level of a subsequent reflection of the initial impulse. The C-duration, which is illustrated in FIG. 3C, is the cumulative total of the time intervals in which the sound pressure level is within 10 dB of the peak pressure level and within −10 dB of the negative value of the peak pressure level. In the example shown in FIG. 3C, the C-duration is equal to $(t_1-t_0)+(t_3-t_2)+(t_5-t_4)$, where $(t_1-t_0)$ and $(t_5-t_4)$ are the time intervals in the which the sound pressure level is within 10 dB of the peak pressure level and $(t_3-t_2)$ is the time interval in which the sound pressure level is within −10 dB of the negative value of the peak pressure level. The D-duration, which is illustrated in FIG. 3D, is the time interval between a time $t_0$ at the beginning of an impulse to a time $t_1$ at which the sound pressure level drops below a level equal to 10 dB less than the peak pressure level.

Table 1 below shows the A-duration, B-duration, and rise time for impulses created by a Remington® .308-caliber shotgun, an M-16 rifle, and a Beretta® .40-caliber pistol fired inside a firing range.

TABLE 1

| Firearm | A-duration (μsec) | B-duration (μsec) | Rise time (μsec) |
| --- | --- | --- | --- |
| Remington ® .308-caliber shotgun | 456 | 676 | 146 |
| M-16 rifle | 340 | 458 | 88 |
| Beretta ® .40-caliber pistol | 258 | 366 | 72 |

Spectral Distribution

Spectral distribution is the resolution of a noise signal into discrete components within a frequency band. It has been shown that noise impulses having the same peak pressure levels but different spectral distributions can cause different amounts of hearing loss. See Patterson J H, Jr. et al., *An Experimental Basis for The Estimation of Auditory Hazard Following Exposure to Impulse Noise*, in NOISE-INDUCED HEARING LOSS, pp. 336-348 (A. Dancer et al. eds., 1992) and Patterson J H, Jr. et al., *The Hazard of Exposure to Impulse Noise as a Function of Frequency*, in Vols. I and II U.S. ARMY AEROMEDICAL RESEARCH LABORATORY, USAARL REPORT No. 91-18, Fort Rucker, Ala. (1991). In addition, higher frequency components create a greater risk of hearing damage than lower frequency components. Thus, it is desirable to analyze the spectral distribution of an impulse noise to determine the potential risk of hearing damage posed by the impulse.

Figure 4:
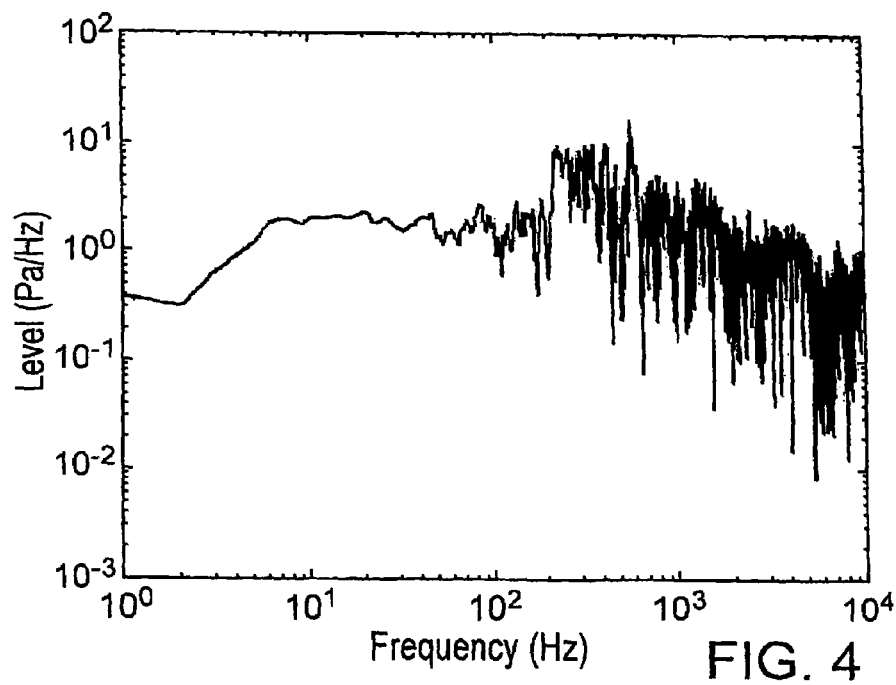
FIG. 4 shows a graph of the frequency distribution of an impulse noise.
Figure 5:
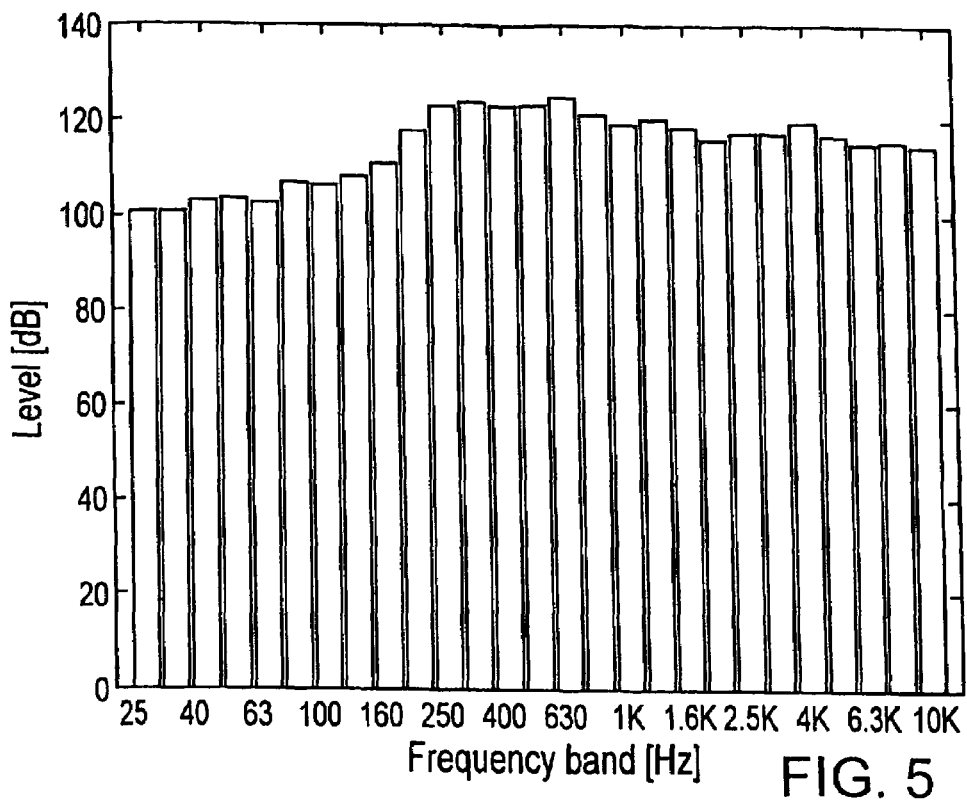
FIG. 5 shows an octave band graph of the impulse noise shown in FIG. 4.

The spectral distribution of an impulse can be expressed as a frequency distribution graph, such as illustrated in FIG. 4. FIG. 4 is a frequency distribution graph between zero and 10,000 Hz of an impulse created by firing a Beretta® .40-caliber pistol. FIG. 5 illustrates the spectral distribution of the same impulse in the form of an octave band graph containing each frequency component between zero and 10,000 Hz.

Number of Impulses

The risk of hearing damage increases with the number impulses. Hence, once the damage risk from a single impulse is defined, a correction factor (also referred to as a "trading relation") can be applied to the peak pressure level to account for the total number of impulses detected during an exposure session. In one approach, for example, a 10-dB correction factor is applied to the peak pressure level for every 100 impulses detected by the unit 12. In another approach, a 5-dB correction factor is applied to the peak pressure level for every 100 impulses detected. Various other trading relations between peak pressure level and number of impulses also can be implemented to asses the potential risk posed by exposure to multiple impulses.

Figure 6:
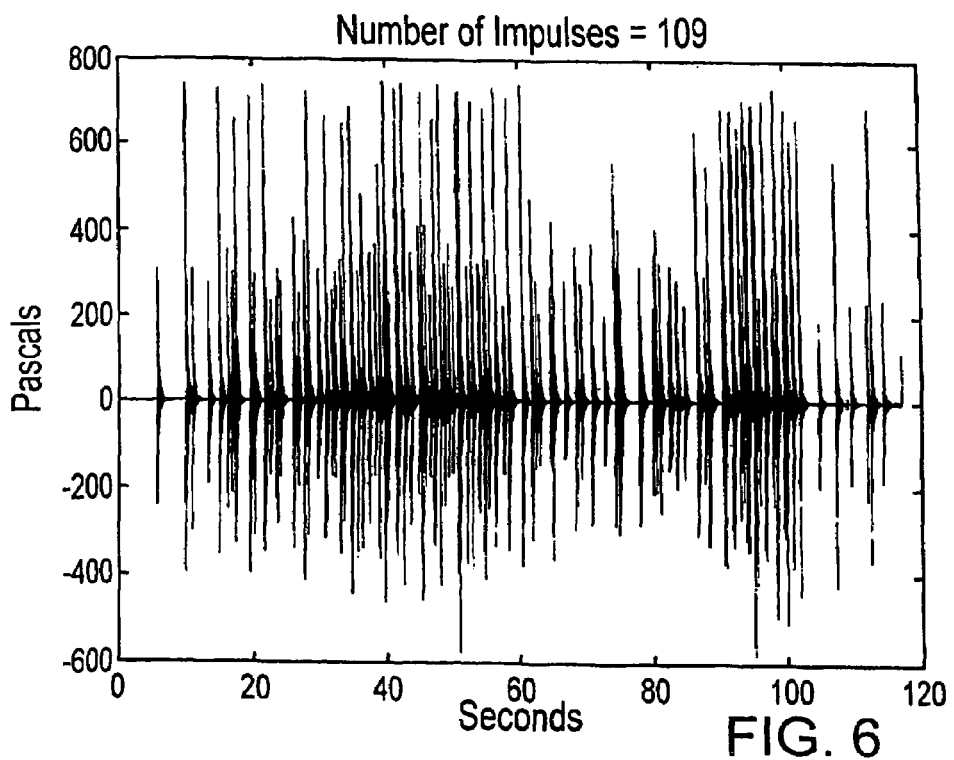
FIG. 6 shows a time-varying acoustic waveform for an entire exposure session.

FIG. 6 is a time-varying waveform acquired during an exposure session of 120 seconds inside a firing range. The number of impulses produced during the exposure session can be determined by counting each peak level greater than a predetermined threshold. As an example, applying a 140-dB threshold to the example shown in FIG. 6, a total of 109 impulses were detected for the exposure session.

Temporal Spacing

Temporal spacing is the time interval between successive impulses. Prior research has shown that temporary threshold shift (TTS) and permanent threshold shift (PTS) is reduced when the time interval between successive impulses is greater than 10 seconds. Perkins, C. et al., *The Effects of interstimulus Interval on the Production of Hearing Loss from Impulse Noise*, in JOURNAL OF THE ACOUSTICAL SOCIETY OF AMERICA, 57 (Supp. 1), S62 (1975). Thus, in assessing risk of hearing damage, a correction factor can be implemented to account for temporal spacing. In one approach, for example, a correction factor, such as 10 dB, can be added to the equivalent continuous sound pressure level, $L_{eq}$, of the exposure session for each instance that the time interval between successive impulses is less than a predetermined amount, such as 10 seconds.

Kurtosis

Kurtosis is a noise parameter that is representative of the impulsiveness and the spectral composition of a noise environment. Specifically, kurtosis is a statistical measure defined as the ratio of the fourth moment to the squared second moment of a distribution:

$$\beta(t) = m_4/(m_2)^2 = \frac{\sum (x_i - \bar{x})^4}{[\sum (x_i - \bar{x})]^2}.$$ (Equation 3)

The value of $\beta(t)$ is a relative measure for the peakedness or flatness of a noise distribution and accounts for all impulses detected during an exposure session, as well as the difference between peaks and background noises. Table 2 below shows kurtosis calculations for a calibration signal and impulses created by three different firearms inside a firing range.

TABLE 2

| Noise | Kurtosis β(t) |
|---|---|
| Calibration signal | 1.7 |
| Beretta ® .40-caliber pistol | 195.65 |
| Remington ® .308-caliber shotgun | 179.23 |
| M-16 rifle | 68.81 |

A similar noise parameter that can be implemented in the system 100 is discussed in Lei, S. F. et al., *The Application of Frequency and Time Domain Kurtosis to the Assessment of Hazardous Noise Exposures*, in 96 JOURNAL OF THE ACOUSTICAL SOCIETY OF AMERICA, 1435-1444 (1994). This noise parameter is based upon kurtosis, but accounts for the equivalent sound level, $L_{eq}$.

Energy

As used herein, the term "energy" refers to any energy-based measurement, including but not limited to, energy flux or A-weighted, 8-hour equivalent energy level, $L_{eqA\text{-}8 \ hr}$. Acoustic energy per unit area, or energy flux, is defined as:

$$E = \frac{1}{Z_0} \int_0^T p(t)^2 \cdot dt \ [\text{J/m}^2],$$ (Equation 4)

where $Z_0$ is the acoustic impedance of air and is equal to 417 $N*s/m^3$, and p(t) is the instantaneous acoustic pressure in Pa or $N/m^2$. Table 3 below shows energy flux calculations for a calibration signal and for an exposure session inside a firing range and in areas adjacent to the firing range.

TABLE 3

| Signal/Area | Energy flux E (J/m²) |
|---|---|
| Calibration signal (124 dB @ 250 Hz) | 2.4119 |
| Firing range | 2.9070 |
| Observation tower | 0.0042 |
| Cleaning room | 0.0032 |
| Classroom | 0.0017 |
| Office | 0.0015 |

Auditory Hazard Units

Another noise parameter that can be used to assess risk of hearing damage is known as Auditory Hazard Units (AHUs), which is discussed in Price, G. et al., *Evaluation of Hazard from Intense Sound with a Mathematical Model of the Human Ear*, in 100 JOURNAL OF THE ACOUSTICAL SOCIETY OF AMERICA, 2674 (1996). This parameter, which takes into account the nonlinearities of the middle ear, can be calculated using the Auditory Assessment Algorithm (AHAA) program discussed in Price, G. et al., *A New Approach: The Auditory Hazard Assessment Algorithm (AHAA)*, in INTERNATIONAL CONFERENCE ON BIOLOGICAL EFFECTS OF NOISE-AUSTRALIA, Conference Proceedings, 2: 725-728 (1998). An AHU can be calculated for a "warned" noise (i.e., a noise that was expected by the subject) and for an "unwarned" noise (i.e., a noise that was not expected by the subject).

MIL-STD-1474

MIL-STD-1474 is the military standard for calculating risk of hearing damage and is defined as:

$P=138+6.67 \log(200/B)+5 \log(100/N)$ (Equation 5)

where P is the permitted peak level, N is the number of impulses, and B is the B-duration for a selected impulse or an average value for the impulses (although B is set at 200 msec if B>200 msec). If there is only one source of impulse noise (e.g., one weapon or one tool), the value for B used in Equation 5 can be the B-duration for a selected impulse (i.e., the first impulse), since the B-duration typically does not vary significantly from one impulse to another. However, if there is more than one source of impulse noise, it may be desirable to use the average B-duration for N impulses as the value for B in Equation 5.

Figure 7:
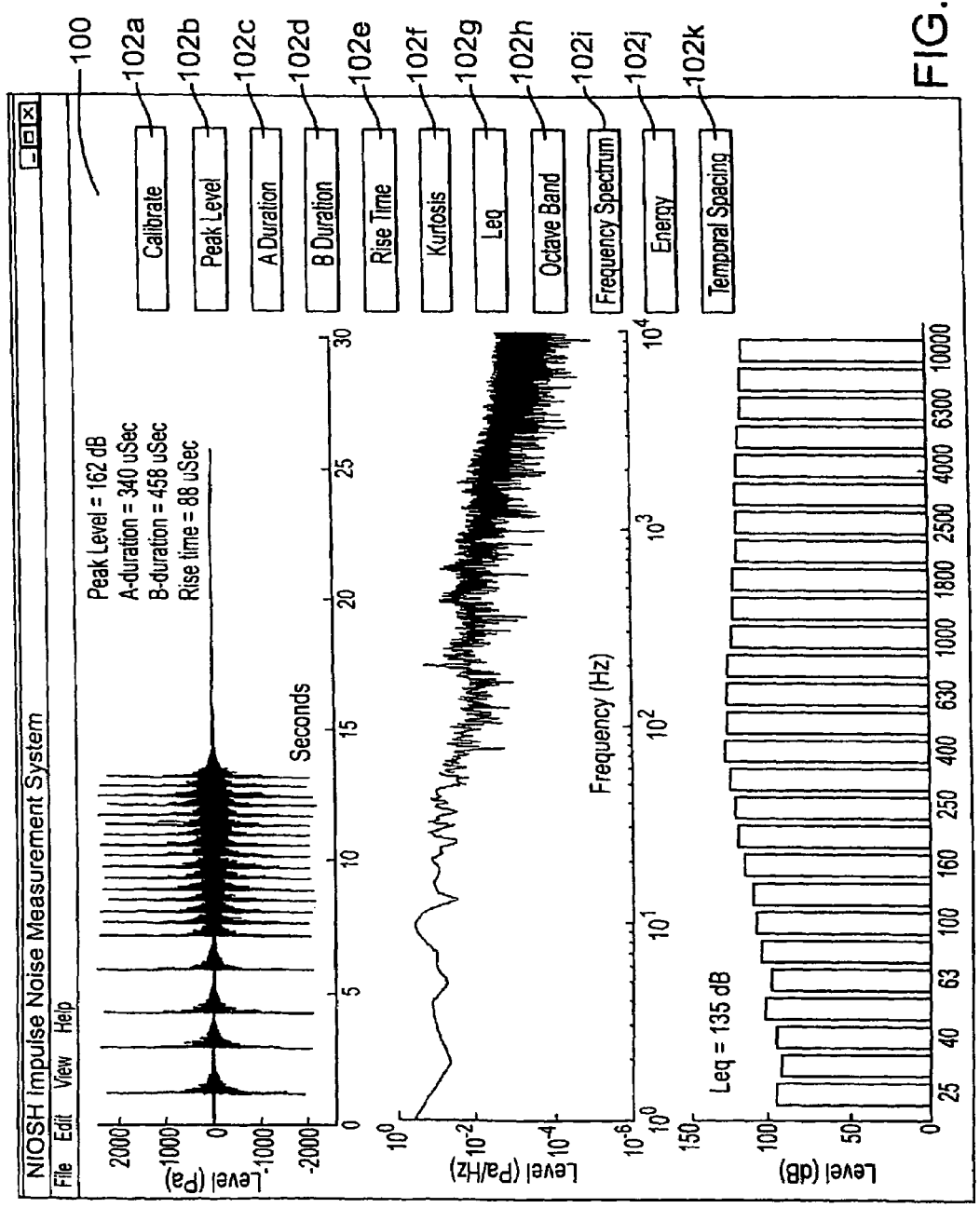
FIG. 7 is a screen shot of a user-interface software program for analyzing noise parameters of a recorded waveform.

Referring now to FIG. 7, there is shown an embodiment of a user-interface software program for use with the system 10 shown in FIG. 1. The program can be used for setting various operating parameters of the unit 12, calculating noise parameters of a waveform, and/or assessing the risk of hearing damage. The program can be implemented in various programming languages and operating systems. In one implementation, for example, the program is implemented in the MATLAB® programming language of The MathWorks, Inc. of Natick, Mass., and is configured to run on a computer having the WINDOWS® operating system of Microsoft Corporation of Redmond, Wash.

The software program described herein is stored on a computer-readable medium and executed on a computing device (e.g., computer 18 shown in FIG. 1). It should be understood, however, that the invention is not limited to any specific computer language, program, operating system or computer. In addition, those of ordinary skill in the art will recognize that devices of a less general-purpose nature, such as hardwire devices, or the like, may also be used.

According to one embodiment, a system implementing the software program includes the computing device 18 (FIG. 1) for executing the program and acquiring user input. In this embodiment, the unit 12 is used to detect the sound level in an environment being monitored and generate a digital signal that includes the waveform of the sound level. The waveform can be recorded in the waveform recorder 56 of unit 12 and then later transferred to the computing device 18 following the sampling period, or alternatively, the digital signal can be transferred in real time to the computing device 18. In an alternative embodiment, the software program is executed on microprocessor 58 of unit 12.

The program desirably includes a plurality of graphical user interface elements that allow a user to select various noise parameters for analysis and to set or select certain operating parameters of the unit 12. Without limitation, graphical user interface elements can be buttons, checkboxes, drop-down pick lists, edit boxes, pop-up menus, a movable cursor or pointer, and the like, as generally known in the art. FIG. 7 illustrates an exemplary embodiment for implementing various user interface elements. However, the types and/or number of interface elements used can be varied in alternative implementations.

As shown in FIG. 7, the illustrated program includes a main display screen or window 100. In the upper portion of the main window 100 there is displayed a time-varying waveform acquired during an exposure session by unit 12 (FIG. 1). The main window 100 also contains a calibrate button 102a, a peak level button 102b, an A-duration button 102c, a B-duration button 102d, a rise time button 102e, a kurtosis button 102f, an $L_{eq}$ button 102g, an octave band button 102h, a frequency spectrum button 102i, an energy flux button 102j, and a temporal spacing button 102k. The main window 100 can also include buttons corresponding to other noise parameters, such as the number of impulses in the waveform and/or buttons for controlling or setting operating parameters of unit 12.

Prior to calculating any noise parameters, a user first presses the calibrate button 102a, which causes the program to apply a calibration factor to the waveform. By pressing any of buttons 102b-102k, the program will calculate the corresponding noise parameter and display the parameter in the main window 100 for analysis by the user. In the example shown in FIG. 7, a frequency spectrum graph and an octave band graph, along with values for peak level, A-duration, B-duration, and rise time, are currently displayed in the window. As a default, the values shown for A-duration, B-duration, and rise time correspond to the first impulse in the waveform, and the value shown for peak level corresponds to the impulse with the greatest amplitude. However, a user can prompt the program to display these values for other impulses in the waveform, such as by pointing and clicking on a specific impulse in the waveform graph with a movable cursor. Although not shown in FIG. 7, a user can prompt the program to calculate and display $L_{eq}$, kurtosis, and energy flux for the entire exposure session by pressing the corresponding button. If desired, a user can prompt the program to calculate $L_{eq}$, kurtosis, and energy flux for a specific portion of the waveform by selecting any two points on the waveform graph, such as via a movable cursor. Pressing the temporal spacing button 102k displays a chart showing the time interval between each impulse in the waveform. Other buttons can be provided for controlling or setting operating parameters of Unit 12.

In another embodiment, a time-varying waveform is displayed in real time (either on the display screen 28 of unit 12 or the monitor of external computing device 18) as noises are detected by unit 12. In this embodiment, the peak level, A-duration, B-duration, and rise time for each impulse can be calculated and displayed as they occur.

Figure 8:
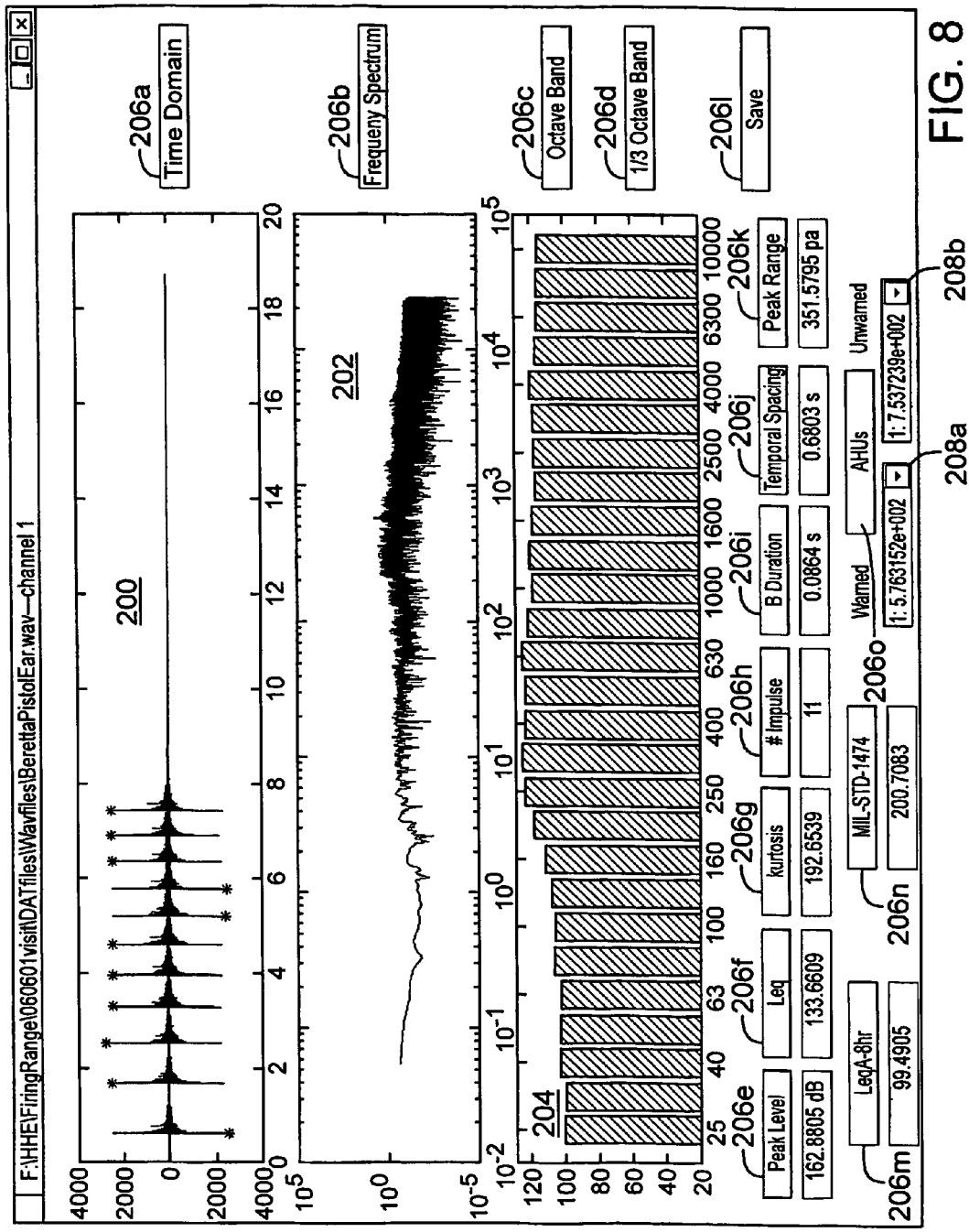

FIG. 8 shows another embodiment of a user-interface software program. This embodiment includes a display window 200 for displaying a waveform, a display window 202 for displaying a frequency spectrum graph, and a display window 204 for displaying an octave band graph. The program also includes a time domain button 206a, a frequency spectrum button 206b, an octave band button 206c, a ⅓ octave band button 206d, a peak level button 206e, an $L_{eq}$ button 206f, a Kurtosis button 206g, a # of impulses button 206h, a B-duration button 206i, a temporal spacing button 206j, a peak range button 206k, a save button 206l, an $L_{eqA-8\ hr}$ (the A-weighted continuous sound level for an 8-hour period) button 206m, a MIL-STD-1474 (military standard) button 206n, and an AHUs (auditory hazard units) button 206o.

Pressing the time domain button 206a, the frequency button 206b, and the octave band button 206c causes the waveform, the frequency spectrum graph, and the octave band graph to be displayed in the respective display windows, as illustrated in FIG. 8. The ⅓ octave band graph button 206d can be used to calculate and display in display window 204 an octave band graph with three times the number of frequency bands of the graph shown in FIG. 8 (and therefore a greater resolution).

Pressing buttons 206e-206k, 206m, and 206n calculates and displays values for the corresponding parameters in the numeric display window below each button. The temporal spacing button 206j calculates the average temporal spacing between successive impulses of the displayed waveform. The peak range button 206k displays the difference between the peak level of the largest impulse and the peal level of the smallest impulse of the displayed waveform. As a default, the value shown for B-duration corresponds to the first impulse in the waveform, and the values shown for peak level corresponds to the impulse with the greatest amplitude, although a user can prompt the program to display these values for other impulses by selecting a different impulse. Also as a default, the values displayed for $L_{eq}$, kurtosis, and $L_{eqA-8\ hr}$, correspond to the entire exposure session, although a user can prompt the program to calculate one or more of these values for a specific portion of the waveform by selecting for each parameter any two points on the waveform graph.

The AHUs button 206o calculates a "warned" AHU value and an "unwarned" AHU value for each impulse of the displayed waveform (only the values for the first impulse are displayed in the numeric display windows below button 206o). Pressing buttons 208a and 208b causes respective drop down lists to appear (not shown), which display the warned and unwarned AHU values for all impulses. The save button 206l can be used to save the data that is calculated by the program.

The present invention has been shown in the described embodiments for illustrative purposes only. The present invention may be subject to many modifications and changes without departing from the spirit or essential characteristics thereof. I therefore claim as my invention all such modifications as come within the spirit and scope of the following claims.

I claim:

1. A system for monitoring exposure to impulse noise, comprising:
    a sound-sensing device operable to sense impulse noise;
    a storage module operable to store the waveform of the impulse noise sensed by the sound-sensing device;
    a processor operable to calculate plural noise parameters of the impulse noise from the waveform; and
    a user interface program operable to allow a user to select one or more of said plural noise parameters and display said selected one or more noise parameters.

2. The system of claim 1, wherein the noise parameters that are calculated by the processor comprise energy, spectral distribution, kurtosis, number of impulses, peak pressure level, rise time, duration, temporal spacing and Auditory Hazard Units.

3. system of claim 1, wherein the user interface program has plural graphical user interface elements that allow for user selection of said selected one or more of said noise parameters to be displayed by the user interface program.

4. The system of claim 1, wherein the sound-sensing device is operable to sense impulse noise levels having a peak pressure level greater than 146 dB.

5. The system of claim 1, wherein the processor calculates a corrected peak pressure level based on the number of impulses detected during a specified time period.

6. The system of claim 1, wherein the processor calculates energy flux according to the equation $$E = \frac{1}{Z_0} \int_0^T p(t)^2 \cdot dt,$$

where $Z_0$ is the acoustic impedance of air and $p(t)$ is the instantaneous acoustic pressure.

7. The system of claim 1, wherein the processor calculates kurtosis according to the equation $\beta(t) = m_{4/(m_2)^2}$, where $m_4$ is fourth moment of a spectral distribution of the impulse noise and $m_2$ is the second moment of the spectral distribution of the impulse noise.

8. The system of claim 1, wherein the processor calculates the duration of an impulse, wherein the duration comprises either the A-duration, B-duration, C-duration, or D-duration of the impulse noises.

9. The system of claim 1, wherein the sound-sensing device comprises a dynamic pressure sensor.

10. The system of claim 1, further comprising a hearing protector having an ear piece, the sound-sensing device being embedded within the ear piece.

11. The system of claim 1, further comprising an analog-to-digital converter operable to receive an analog signal representative of the impulse noise from the sound-sensing device and convert the analog signal into a digital signal, the analog-to-digital converter having a sampling rate of at least 200 KHz, and wherein the storage module stores the digital signal from the analog-to-digital converter.

12. A method for monitoring exposure to impulse noise, comprising:
    detecting impulse noise;
    recording an acoustic waveform of the detected impulse noise;
    calculating plural noise parameters of the detected impulse noise from the recorded waveform; and
    selecting, via one or more user-interface elements, one or more of the plural noise parameters;
    displaying the selected noise parameters; and
    assessing the potential hazard of the impulse noise through analysis of the selected noise parameters.

13. The method of claim 12, wherein calculating plural noise parameters comprises calculating energy, spectral distribution, kurtosis, number of impulses, peak pressure level, rise time, duration, temporal spacing and Auditory Hazard Units from the recorded waveform.

14. The method of claim 12, comprising detecting impulse noise levels having a peak pressure level greater than 146 dB.

15. The method of claim 12, comprising calculating the peak pressure levels of the detected impulse noise and calculating corrected peak pressure levels to account for the number of impulses detected during a specified time period.

16. The method of claim 12, comprising calculating energy flux from the recorded waveform according to the equation $$E = \frac{1}{Z_0} \int_0^T p(t)^2 \cdot dt,$$

where $Z_0$ is the acoustic impedance of air and $p(t)$ is the instantaneous acoustic pressure.

17. The method of claim 12, comprising calculating kurtosis from the recorded waveform according to the equation $\beta(t) = m_{4/(m_2)^2}$, where $m_4$ is fourth moment of a spectral distribution of the impulse noise and $m_2$ is the second moment of the spectral distribution of the impulse noise.

18. The method of claim 12, comprising calculating the A-duration, B-duration, C-duration, or D-duration of a detected impulse.

19. The method of claim 12, further comprising displaying a time-varying graph of the recorded waveform.

20. The method of claim 12, comprising detecting impulse noise with a dynamic pressure sensor.

21. A method for monitoring exposure to impulse noise, the method comprising:
    detecting multiple sound impulses during a specified period of time;
    determining the peak pressure level of the detected impulses; and
    calculating a corrected peak pressure level for at least one of the detected impulses based on the number of impulses detected during the specified period of time.

22. The method of claim 21, wherein the act of detecting multiple impulses during a specified period of time comprises detecting impulses having peak pressure levels greater than a predetermined value.

23. The method of claim 21, further comprising displaying the number of detected impulses.

24. The method of claim 21, further comprising calculating kurtosis for a plurality of said impulses according to the equation $\beta(t) = m_{4/(m_2)^2}$, where $m_4$ is fourth moment of a spectral distribution of the plurality of impulses and $m_2$ is the second moment of the spectral distribution of the plurality of impulses.

25. An apparatus for monitoring exposure to impulse noise, comprising:
    a sound-sensing device operable to sense impulse noise; and
    a processor operable to calculate the peak pressure level of impulses sensed by the sound-sensing device and operable to calculate a corrected peak pressure level of an impulse based on the number of impulses sensed in a specified period of time.

26. The apparatus of claim 25, wherein the sound-sensing device is operable to sense impulse noise levels having a peak pressure level greater than 146 dB.

27. The apparatus of claim 25, wherein the sound-sensing device comprises a piezoelectric pressure sensor.

28. The apparatus of claim 25, wherein the processor is operable to calculate the following noise parameters of an impulse noise sensed by the sound-sensing device: energy, spectral distribution, kurtosis, number of impulses, peak pressure level, rise time, duration, temporal spacing and Auditory Hazard Units.

29. The apparatus of claim 25, further comprising a computing device having a user interface program operable to allow a user to select one or more of said noise parameters and display said selected one or more noise parameters.

* * * * *